US011452926B1

(12) United States Patent
Han

(10) Patent No.: US 11,452,926 B1
(45) Date of Patent: Sep. 27, 2022

(54) METHODS OF USING MULTIPLE REGRESSION IN FOOTBALL TENDENCY ANALYSIS

(71) Applicant: Edward Han, Washington, DC (US)

(72) Inventor: Edward Han, Washington, DC (US)

( * ) Notice: Subject to any disclaimer, the term of this patent is extended or adjusted under 35 U.S.C. 154(b) by 183 days.

(21) Appl. No.: 16/873,794

(22) Filed: Jul. 8, 2020

(51) Int. Cl.
*A63B 71/06* (2006.01)
*A63B 43/00* (2006.01)
*G06N 7/00* (2006.01)

(52) U.S. Cl.
CPC ......... *A63B 71/0616* (2013.01); *G06N 7/005* (2013.01)

(58) Field of Classification Search
CPC .......... A63F 13/828; G06Q 10/06; G06Q 10/06315; G06Q 10/06375; G06Q 10/067; A63B 71/0616; A63B 2214/00; G09B 19/0038
See application file for complete search history.

(56) References Cited

U.S. PATENT DOCUMENTS

| | | | |
|---|---|---|---|
| 4,019,737 A | 4/1977 | Witzel | |
| 5,916,024 A | 6/1999 | Von Kohorn | |
| 7,334,796 B2 | 2/2008 | Wittwer | |
| 8,016,664 B2 | 9/2011 | Thomas et al. | |
| 8,210,916 B2 | 7/2012 | Ma et al. | |
| 8,494,946 B2 | 7/2013 | Lortscher | |
| 8,684,819 B2 | 4/2014 | Thomas et al. | |
| 8,780,204 B2 | 7/2014 | DeAngelis et al. | |
| 9,424,615 B2 | 8/2016 | McRoberts | |
| 2006/0247808 A1 | 4/2006 | Robb | |
| 2007/0021165 A1 | 1/2007 | Ma et al. | |
| 2007/0021167 A1* | 1/2007 | Ma | A63F 13/798 463/4 |
| 2007/0022029 A1 | 1/2007 | Ma et al. | |
| 2007/0134639 A1 | 6/2007 | Sada et al. | |
| 2011/0169959 A1* | 7/2011 | DeAngelis | G06T 7/70 348/157 |
| 2013/0060362 A1 | 3/2013 | Murphy et al. | |
| 2015/0131845 A1 | 5/2015 | Forouhar et al. | |

(Continued)

OTHER PUBLICATIONS

Patel, P., "NFL Tendency Analysis and Basic Play Type Prediction," https://sites.northwestern.edu/msia/ (Jan. 31, 2020).

(Continued)

*Primary Examiner* — Lawrence S Galka

(57) ABSTRACT

Methods are disclosed in which the user defines three or more categories of plays that an American football opponent may run and multiple regression techniques are used to estimate the probability that the opponent will run a play in each such category, under particular game conditions, based on data collected from the opponent's past games. The regression coefficients and game condition data are entered into a computer device, which calculates the predicted probabilities and sorts and displays the categories of plays according to such probabilities. The user may assign ratings or rankings to schemes that the user may execute, based on the expected effectiveness of each such scheme against each category of plays that the opponent may run, and such ratings or rankings may be combined with the predicted probabilities to recommend schemes to the user under various game conditions. If permitted by the rules, such predictions or recommendations may be used to assist the user in play calling during a game. The methods may also be used to enhance scouting reports, improve efficiency of practices, and/or develop more sophisticated play sheets.

14 Claims, 10 Drawing Sheets

(56) References Cited

U.S. PATENT DOCUMENTS

| | | | |
|---|---|---|---|
| 2015/0283450 A1* | 10/2015 | McRoberts | G06Q 10/10 473/470 |
| 2017/0259115 A1* | 9/2017 | Hall | A61B 5/68 |
| 2019/0217183 A1* | 7/2019 | Huke | G06Q 10/0639 |
| 2020/0061478 A1* | 2/2020 | Kopf | G07F 17/326 |

OTHER PUBLICATIONS

Mack, A., Statistical Sports Models in Excel (2019).
Ota, K.L, "Football Play Type Prediction and Tendency Analysis," https://dspace.mit.edu/bitstream/handle/1721.1/113120/1016455954-MIT.pdf (Jun. 2017).
Lee, P., Chen, R., Lakshman, V., Predicting Offensive Play Types in the National Football League, https://pdfs.semanticscholar.org/37c5/268dc039d4f17bb8cbbe6881bf1bf8187dba.
Lowry, M.J., PhD Football: Scouting (2015).
Jordan, J.D., Melouk, S., Perry, M.B., "Optimizing Football Game Play Calling," Journal of Quantitative Analysis in Sports 5(2):2-2, pp. 1-32.
Boronico, J., Newbert, S.L., "An Empirically Driven Mathematical Modelling Analysis for Play Calling Strategy in American Football," European Sport Management Quarterly 1(1).
Stefani, R.T., "Applications of Statistical Methods to American Football," Journal of Applied Statistics, 14:1:61-73 (1987).
Carter, V., Machol, R.E., "Optimal Strategies on Fourth Down," Management Science vol. 24, No. 16, 1758 (Dec. 1978).
Belichick, S., Football Scouting Methods (The Ronald Press Co., USA 1962).

\* cited by examiner

| Obs. Number | Zone Blocking | Play Action | ... | Deep Dropback | Down | Distance | Field Position | ... | Shotgun |
|---|---|---|---|---|---|---|---|---|---|
| 1 | 0 | 1 | ... | 0 | 1 | 10 | 25 | ... | 0 |
| 2 | 1 | 0 | ... | 0 | 1 | 10 | 38 | ... | 0 |
| ... | ... | ... | ... | ... | ... | ... | ... | ... | ... |
| 333 | 0 | 0 | ... | 1 | 3 | 10 | 85 | ... | 1 |

DEPENDENT VARIABLE: DEEP DROPBACK ← 210

| Regression Statistics | |
|---|---|
| R Square | 0.212 |
| Adjusted R Square | 0.187 |
| Standard Error | 0.340 |
| Observations | 333 |

| Explanatory Variable | Coefficient | Standard Error | t Statistic |
|---|---|---|---|
| Intercept | 0.6543 | 0.302 | 2.169 |
| ODYPR | -0.2542 | 0.158 | -1.609 |
| STR | -0.0689 | 0.013 | -5.481 |
| STR$^2$ | 0.0009 | 0.000 | 4.006 |
| 2M1H | 0.0028 | 0.002 | 1.754 |
| DD | 0.0401 | 0.017 | 2.329 |
| DD$^2$ | -0.0003 | 0.001 | -0.292 |
| OwnGLProx | -0.0039 | 0.002 | -2.364 |
| OppGLProx | -0.0040 | 0.002 | -2.555 |
| TEs | -0.0234 | 0.045 | -0.518 |
| RBs | 0.0620 | 0.070 | 0.883 |

DEPENDENT VARIABLE: ZONE BLOCKING ← 210

| Regression Statistics | |
|---|---|
| R Square | 0.185 |
| Adjusted R Square | 0.160 |
| Standard Error | 0.385 |
| Observations | 333 |

220

| Explanatory Variable | Coefficient | Standard Error | t Statistic |
|---|---|---|---|
| Intercept | -0.3649 | 0.342 | 1.068 |
| ODYPR | 0.2572 | 0.179 | 1.437 |
| STR | 0.0850 | 0.014 | 5.968 |
| $STR^2$ | -0.0014 | 0.000 | -5.162 |
| 2M1H | -0.0034 | 0.002 | -1.890 |
| DD | -0.0473 | 0.020 | -2.420 |
| $DD^2$ | -0.0014 | 0.001 | 1.445 |
| Own GL Prox | 0.0020 | 0.002 | 1.084 |
| Opp GL Prox | 0.0016 | 0.002 | 0.912 |
| TEs | 0.0707 | 0.051 | 1.381 |
| RBs | 0.1073 | 0.080 | 1.883 |

METHODS OF USING MULTIPLE REGRESSION IN FOOTBALL TENDENCY ANALYSIS

BACKGROUND OF THE INVENTION

The following is a tabulation of some prior art that presently appears relevant:

U.S. Patents

| Pat. No. | Kind Code | Issue Date | Patentee |
| --- | --- | --- | --- |
| 9,424,615 | B2 | 2016 Aug. 23 | McRoberts |
| 8,780,204 | B2 | 2014 Jul. 15 | DeAngelis, et al. |
| 8,684,819 | B2 | 2014 Apr. 1 | Thomas, etal. |
| 8,494,946 | B2 | 2013 Jul. 23 | Lortscher |
| 8,210,916 | B2 | 2012 Jul. 3 | Ma, et al. |
| 8,016,664 | B2 | 2011 Sep. 13 | Thomas, et al. |
| 7,334,796 | B2 | 2008 Feb. 26 | Wittwer |
| 5,916,024 | A | 1999 Jun. 29 | Von Kohorn |
| 4,019,737 | A | 1977 Apr. 26 | Witzel |

U.S. Patent Application Publications

| Publication No. | Kind Code | Publication Date | Applicant |
| --- | --- | --- | --- |
| 20150131845 | A1 | 2013 May 3 | Forouhar, et al. |
| 20130060362 | A1 | 2011 Sep. 3 | Murphy, et al. |
| 20070191110 | A1 | 2006 Feb. 10 | Van Allen Crouse |
| 20070134639 | A1 | 2005 Dec. 13 | Sada, etal. |
| 20070022029 | A1 | 2005 Jul. 21 | Ma, et al. |
| 20070021165 | A1 | 2005 Jul. 21 | Ma, et al. |
| 20060247808 | A1 | 2006 Apr. 14 | Robb |

Nonpatent Literature Documents

Patel, P., "NFL Tendency Analysis and Basic Play Type Prediction," https://sites.northwestern.cdu/insia/(Jan. 31, 2020)

Mack, A., Statistical Sports Models in Excel (2019)

Ota, K. L, "Football Play Type Prediction and Tendency Analysis," https://dspace.mit.edu/bitstrcani/handle/1721.1/113120/1016455954-MIT.pdf (June 2017)

Lee, P., Chen, R., Lakshman, V., Predicting Offensive Play Types in the National Football League, https://ydfs.scmanticscholar.org/37c5/268dc039d4fl7bb8cbbe6881bfl bfB187dba.Wdf Jones, W. D., "Model Predicts Whether NFL Teams Will Run or Pass," https://spectrum.ieee.orj/tech-talk/geek-life/tools-toys/statistical-model-predicts-whether-nfl-teams-will-run-or-pass (Aug. 13; 2015)

Lowry, M. J., PhD Football: Scouting (2015)

Jordan, J. D., Melouk, S., Perry, M. B., "Optimizing Football Game Play Calling," Journal of Quantitative Analysis in Sports 5(2):2-2 (Dec. 2008)

Boronico, J., Newbert, S. L., "An Empirically Driven Mathematical Modelling Analysis for Play Calling Strategy in American Football," European Sport Management Quarterly l(1):21-38 (Feb. 2008)

Stefarii, R. T., "Applications of Statistical Methods to American Football," Journal of Applied Statistics, 14:1: 61-73 (1987)

Carter, V., Machol, R. E., "Optimal Strategies on Fourth Down," Management Science Vol. 24, No. 16, 1758 (Dec., 1978)

Belichick, S., Football Scouting Methods (The Ronald Press Co., 1962)

In American football, scouting an opponent to identify tendencies—the opponent's propensity to run certain types of plays under particular conditions—is a critical step in game preparation. Coaching staffs typically review film or video recordings of the opponent's past games and other information sources, collecting data on the types of plays that the opponent ran in particular down and distance situations, at particular positions on the field, with particular combinations of personnel, from particular formations, etc. The information is analyzed to prepare scouting reports that will inform team members about what to expect from the opponent and to organize practices, where "scout teams" simulate the plays that the opponent is expected to run. Tendency analysis is also essential for sound play calling—i.e., choosing the right scheme to deploy against the opponent in various game conditions (down and distance, field position, etc.).

The statistical methods that teams use to analyze opponents' tendencies, however, are crude, simply calculating the percentage of times the opponent ran each type of play in various situations. Although numerous factors—e.g., down and distance, field position, and personnel package-simultaneously influence the likelihood of each type of play, it is impractical to assess the impact of all relevant factors simultaneously using current methods. For example, analyzing seven distinct down and distance situations (e.g., first down, second and short, second and medium, second and long, third/fourth and short, third and medium, third and long), five distinct positions on the field (e.g., inside own 10, between own 10 and own 30, between the 30s, between opponent's 30 and opponent's 10, inside opponent's 10), and nine different personnel packages (e.g., all combinations of zero to two running backs and zero to two tight ends) simultaneously would require data on 315 (7×5×9) distinct scenarios. Reviewing film of an opponent's last six games would yield data on approximately 400 of that opponent's offensive plays. If those plays were disaggregated into discrete combinations of down and distance, field position, and personnel package, there would be few or no plays to evaluate in most of the individual combinations-certainly not enough to draw statistically meaningful conclusions.

Any attempt to analyze these factors with greater precision—e.g., by disaggregating "third and short" into two distinct situations, "third and one" and "third and two"-would geometrically increase the number of discrete combinations, exacerbating the problem of data sufficiency. The number of scenarios would increase even more rapidly if other factors, such as formation, the effect of particular players' presence in the game, or lateral field position (i.e., position relative to the hash marks, which may be significant at the high school and collegiate levels) were included in the analysis.

As a result, opponents' play-calling tendencies are typically reported in scouting reports with respect to one factor at a time. *For example, it may be separately reported that (1) when inside its own 10-yard line, a team calls a high percentage of runs, with zone blocking, and (2) on third down and between three and five, the team calls a high percentage of play action passes. These two separate data points, however, have limited value in predicting what this team would do on third-and-four from its own seven-yard line. The tools available to the play caller on the sideline are similarly rudimentary-typically, a laminated sheet divided into boxes, suggesting schemes to be executed in a handful of down-and-distance and field position combinations.

Moreover, the data used to calculate play-calling tendencies are typically not controlled for the score and time remaining in the game. The plays that a team calls late in a game when leading or trailing by a substantial margin are not likely to be representative of the plays that team would call early in a close game. Eliminating from the dataset all plays called when a team is leading or trailing late in a game, however, would risk the loss of useful information and further exacerbate the data sufficiency problem.

It would be advantageous to apply more powerful statistical techniques to analyze data on opponents' historical tendencies in order to facilitate preparation of scouting reports, efficient use of practice time, and sound play calling during games. The methods disclosed herein apply multiple linear regression (MLR) techniques to data about an opponent's behavior in past games to calculate the probabilities that the opponent will call certain types of plays under particular conditions in a future game.

Prior art patent publications involving play calling in American football have disclosed, for example, algorithms applying probability tables to decide whether to punt, attempt field goals, etc. (U.S. Pub. No. 20150283450), games based on players' predictions regarding plays that would be called during football games (U.S. Pat. No. 7,334,796, U.S. Pub. No. 20130060362), football-based board games (U.S. Pat. No. 4,019,737), or football-based video games (U.S. Pat. Nos. 8,016,664, 8,684,819). Patent publications that have applied MLR to American football have, for example, used MLR to estimate the probability that a given play will lead to a score (e.g., U.S. Pat. No. 8,210,916), to facilitate gambling (e.g., U.S. Pat. No. 8,494,946), or to evaluate players (e.g., U.S. Pub. No. 20070022029).

Although attempts to apply MLR to American football have been described in a few publications, these attempts have largely sought to predict the outcomes of games in order to gain an advantage in gambling (e.g., Mack 2019). Publications addressing play calling have applied game theory (e.g., Jordan 2008) and/or focused on maximizing success under particular game conditions, such as first and goal (e.g., Boronico 2001) or fourth down situations (e.g., Carter 1978). A few publications have applied MLR to play calling but only to predict whether a play would be a run or a pass (e.g., Patel (2020), Ota (2017)); this would be of limited utility for defensive play callers, since there are different types of runs and passes, and a defensive scheme that would be highly effective against one type of run or pass might be extremely vulnerable against another. The prior art does not disclose or suggest allowing the user to define more than two categories of plays, run or pass, and to use MLR to estimate the probability, based on particular game conditions, that an opponent will run a play in each such category.

A method of predicting the likelihood of several categories of plays defined by the user—e.g., zone blocking vs. traps or pulling linemen, play action vs. drop back passes vs. RPOs, plays to strong side vs. weak side, etc.—would be far more valuable to users calling plays, compiling scouting reports, organizing practices, or preparing play sheets.

SUMMARY OF THE INVENTION

Multiple Linear Regression

Multiple linear regression (MLR) is a statistical technique that is widely used in the social sciences-especially economics, where it is the principal methodology used in the sub-discipline of "econometrics"—to evaluate and quantify the simultaneous effect of several "explanatory" or "independent" variables on a particular outcome (the "dependent" variable). For example, accumulated wealth and current disposable income may both impact the consumer spending of a household; MLR may be used to estimate a single equation (a "regression model") that predicts consumer spending (the dependent variable) as a function of both wealth and income (the explanatory variables).

In general, a multiple regression model takes the form:

$$y = \beta_0 + \beta_1 x_1 + \beta_2 x_2 + \cdots + \beta_k x_k$$

where there are k explanatory variables; y is the dependent variable; $x_1$ through $x_k$ are the explanatory variables; $\beta_1$ through $\beta_k$ are the coefficients generated by MLR to estimate. the relationship between each of the explanatory variables $x_1$ through $x_k$ and the dependent variable y; and $\beta_0$ is the intercept, which represents the estimated value of the dependent variable y if all of the explanatory variables $x_1$ through $x_k$ were equal to zero.

When the explanatory variables can be known or assumed in advance, a regression model may be used to make predictions about the dependent variable. For example, a policymaker wishing to predict the impact of a tax cut on consumption can compare two versions of the regression equation described above-one version assuming a lower level of disposable income, to predict consumption without a tax cut, and another assuming higher disposable income, to predict consumption with a tax cut.

In some cases, simply multiplying an explanatory variable x by a constant coefficient $\beta$ does not yield the best approximation of the relationship between x and the dependent variable y. For example, y may increase geometrically with x; in that case, $x^2$ can be used as an explanatory variable. Other functional forms may also be used: e.g., quadratics, where both x and $x^2$ are included as explanatory variables; interactive variables, where an explanatory variable is the product of two other variables; the logarithms of either the dependent variable or explanatory variables; etc.

The variables used in a regression model need not be exclusively quantitative; they may reflect the presence or absence of certain qualities or the occurrence or nonoccurrence of particular events. In such cases, "binary" or "dummy" variables, which take on the value 1 or 0-depending on whether the quality in question is present or absent—are used. For example, a researcher using historical data to study consumer spending could measure or control for the effect of World War II by adding to the regression model a dummy variable with the value 1 during the years 1941 through 1945 and the value 0 in all other years.

A regression model in which the dependent variable is binary, taking on the value 1 if a particular event occurs and 0 if it does not, is a linear probability model (LPM). In LPMs, the predicted value of the dependent variable represents the probability that the event will occur, given the values of the explanatory values. A logarithm of the odds that an event will occur can also be used as the dependent variable ("logistic regression" or "logit model"). Although the examples and descriptions herein relate largely to applications of LPMs, a skilled practitioner will recognize that the methods disclosed herein could readily be adapted to regression models taking logit or other forms. There is no intention to limit the scope of the claims to linear probability models.

Application of MLR to Analysis of Football Tendencies

In accordance with the methods disclosed herein, the user defines a plurality of categories of plays that the opponent might run and creates a statistical database based on a review of the opponent's past games. The database contains a dummy variable corresponding to each category of play. Each play run by the opponent is assigned to one of the categories—i.e., the dummy variable corresponding to that category will be assigned a value of 1; the dummy variables corresponding to all other categories will be assigned a value of 0. Other relevant data—e.g., quarter, time remaining, score, down and distance, field position, personnel package, formation, etc.—corresponding to each play run by the opponent are also stored in the database.

Further in accordance with the method disclosed herein, the statistical database is used to run multiple regressions using the dummy variables for each category of play as the dependent variable. The explanatory variables used in such regressions reflect the score and time remaining, down and distance, and field position. The explanatory variables may also include variables reflecting personnel in the game, formation, and other factors relevant to the opponent's play selection. The coefficients generated by the regressions are used to predict, for each play category, the likelihood that the opponent will call a play in that category under given conditions during a game.

In one embodiment, the explanatory variables are input into or calculated by a computer during a game immediately following the preceding play; for each of the play categories, the probability that the opponent will run a play in that category on the subsequent down are computed from the coefficients generated by the regression equations. The probability for each category is displayed, in order of likelihood, on a tablet computer or other device accessible to users in time to assist in the selection of a scheme from the game plan—i.e., the collection of schemes that the user's team has prepared to deploy against the opponent—and for such scheme to be communicated to players on the field.

In another embodiment, in the course of game preparation, the user assigns a numerical rank or rating to each scheme in its game plan based on the expected effectiveness of the scheme against each of the categories of plays that the opponent may run. These a priori ranks or ratings are stored in the computer along with the regression coefficients. The computer calculates a weighted average rank or rating for each scheme based on its rank or rating against each category of play and the probability that the opponent will run a play in that category. Recommended schemes are displayed, in order of their weighted rank or rating, in time to assist in the selection of a scheme from the game plan and for such scheme to be communicated to players on the field. In a further embodiment, the a priori ranks or ratings of any scheme against particular categories of plays could be adjusted over the course of a game based on actual outcomes, thereby refining subsequent recommendations.

Even if the rules do not permit such use of computer technology on the sideline or in the coaches' box to assist with play calling during games, the methods disclosed herein can be used to identify keys that should be noted in the scouting report, to improve the efficiency of practices by more accurately simulating an opponent's behavior, to develop more sophisticated play sheets, and to supplement and enhance the users' intuition regarding an opponent's play calling.

BRIEF DESCRIPTION OF THE DRAWINGS

FIG. 2 depicts an exemplary structure for a statistical database created and used according to the methods disclosed herein.

FIG. 3A depicts the regression output for a particular category of plays.

FIG. 3B depicts the regression output for another category of plays.

DETAILED DESCRIPTION OF THE INVENTION

The descriptions and examples of the methods disclosed herein are provided from the perspective of a user seeking to analyze the offensive play calling tendencies of an opponent, in order to develop and deploy effective defensive schemes. A skilled practitioner will recognize that the methods disclosed herein could similarly be used to analyze the opponent's defensive tendencies to facilitate the user's development of an offensive game plan or to assist in offensive play calling. There is no intention to limit the scope of the claims to the prediction of the opponent's offensive plays or to the facilitation of defensive play calling or game preparation.

Figure 1:
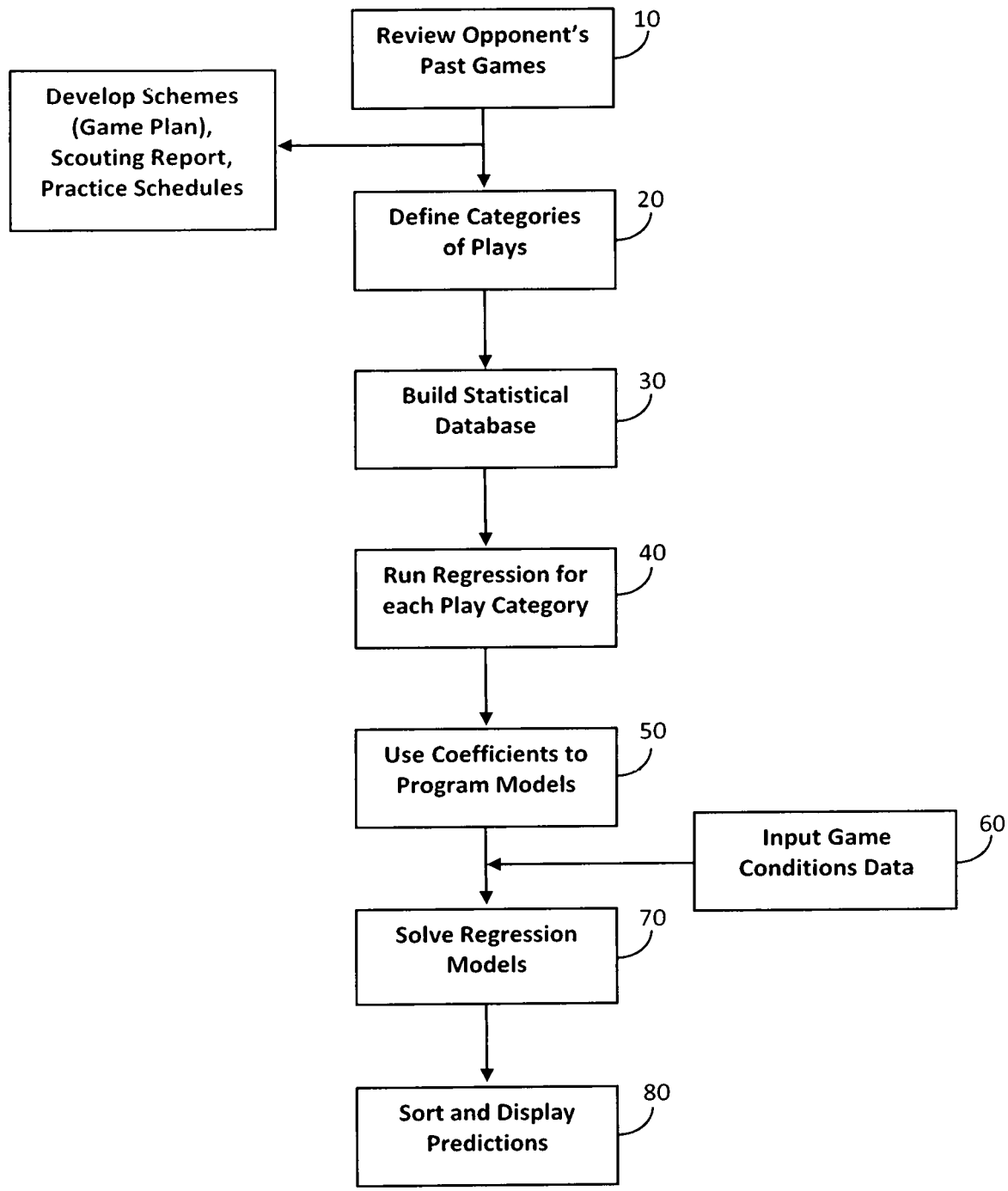
FIG. 1 is a flow chart depicting the steps in an embodiment of the methods disclosed herein.

FIG. 1 is a flow chart depicting an embodiment of the methods disclosed herein. In the initial step 10, films, videos, and/or other records of the opponent's past games are reviewed to collect information needed in steps 20, definition of categories of plays that the opponent has run in past games, and 30, construction of a computerized statistical database. As noted in FIG. 1, the information collected in step 10 is of the type commonly used to develop game plans, scouting reports, and practice schedules.

In step 20 of the method, the user defines a plurality of categories of offensive plays that the opponent might run. The categories should be defined so as to be exhaustive and non-overlapping, meaning that every play that the opponent might run will fall within the definition of exactly one category.

In one experiment, the ten categories, described in Table 1, were used:

TABLE 1

| Play Category | Definition |
| --- | --- |
| Zone Blocking | Simple handoff with zone blocking, typically with double team at point of attack |
| Trap/Pull Blocking | Simple handoff or pitch with interior lineman or linemen (including tight end) trap blocking or pulling |
| Option Run | Handoff with extended mesh point or trailing pitch man |
| Draw/Delay | Delayed handoff or quarterback draw after showing pass |
| Reverse | Handoff or pitch to a receiver, including jet sweep, end around, reverse, flea flicker, etc. |

TABLE 1-continued

| Play Category | Definition |
|---|---|
| RPO | Quarterback roll out or bootleg |
| Screen | Any screen pass |
| Play Action | Play action pass (except where a fake handoff precedes an RPO or screen pass) |
| Short Dropback | Less than 3-step dropback from shotgun; less than 5-step dropback from under center |
| Deep Dropback | More than 2-step dropback from shotgun; more than 5-step dropback from under center |

Note that these definitions provide unambiguous rules for resolution where a play seems initially to fall into more than one category—e.g., when a screen pass is preceded by play action.

The play categories should be defined with sufficient precision to be useful for preparing scouting reports, planning practices, and play calling—i.e., selection of schemes likely to be effective against plays that the opponent is expected to run. As noted above, the ability to predict only two categories of offensive plays-"run" and "pass"—is likely to be of extremely limited value. Each category should be defined, however, to ensure that the statistical database contains sufficient observations of plays in that category; otherwise, the regression equation for that category will not yield meaningful coefficients. It is recommended that the categories be defined so as to provide at least three observations in each category. (Out of a total of 333 plays from five games included in the database created for the experiment described herein, three (0.9%) were in the Draw/Delay category.)

While the embodiments described herein reflect particular definitions of the categories, a skilled practitioner will recognize that useful results may be obtained using different categories. There is no intention to limit the scope of the claims to the particular categories described herein.

Referring again to FIG. 1, in the next step 30 of the method, a computerized database is constructed using information collected in steps 10 and 20. The database software allows for mathematical manipulation of the data and includes or readily interfaces with statistical software that can be used for MLR.

FIG. 2 depicts an exemplary structure for the statistical database 100. Based on the review of the opponent's past games, each offensive play is included in the database 100 as a separate observation 110. (In the experiment described herein, five of the opponent's games were reviewed, yielding 333 observations.) Only plays that provide information about the opponent's play calling tendencies are included in the database. Thus, while punts, field goal attempts, kneel downs, spikes, and fumbled snaps are technically offensive plays, they would not be included in the database. Plays that are called back due to penalty would be included, so long as the type of play the opponent intended to run is apparent.

Each observation 110 in the database 100 includes an entry in each of the fields 120. Each of the fields 120 corresponds to one of the categories of plays defined by the user; in the experiment described herein, there were ten such fields 120, corresponding to the ten defined play categories. For each observation 110, one of the fields 120 will have a value of 1, indicating that the opponent ran a play in that category; all other fields 120 will have a value of 0. The values in each of the fields 120 will be used as the dependent variable in one of the regression equations estimated in accordance with the method disclosed herein.

As shown in FIG. 2, in addition to fields for play categories 120, the statistical database 100 comprises a plurality of additional fields 130 and 140 for each observation 110. Fields 130 and 140 contain data that will be used as explanatory variables in the regressions and/or to calculate such variables, in accordance with the method disclosed herein.

The fields 130 contain, for each observation 110, data relating to the opponent's play selection that is known (or can be accurately approximated) immediately after the conclusion of the preceding play—e.g., the score of the game, the time remaining, down and distance, field position, personnel in the opponent's huddle.

The fields 140 contain, for each observation 110, data relating to the opponent's formation when the play begins, which, due to the opponent's ability to execute various shifts and motions, cannot be known until the ball is snapped. The data contained in the fields 140 may include, for example, the number of running backs in the backfield, whether tight ends are lined up strong right or left, the number of receivers split right or left, whether the quarterback is under center or in the shotgun, etc.

Referring again to FIG. 1, in the next step 40 of the method, the data in the statistical database are used to estimate a regression equation for each category of plays. The dependent variable in the regression for each category is a dummy variable with the value 1 for an observation if the opponent ran a play in that category and the value 0 otherwise. The explanatory variables in each regression are constructed from the data contained in the statistical database reflecting the conditions when each play was run; the same explanatory variables are used in each regression. In the experiment described herein, ten regressions were run, one corresponding to each defined category of plays.

While the methods disclosed herein reflect particular specifications of the regressions, a skilled practitioner will recognize that useful results may be obtained using different explanatory variables, including different functional forms or interactions of the data used to calculate the variables described herein. There is no intention to limit the scope of the claims to the particular regression specifications described herein.

In the experiment described herein, ten explanatory variables, described in Table 2, were used:

TABLE 2

| Explanatory Variable | Description |
|---|---|
| ODYPR | A variable intended to measure the team's perception of its opponent's relative vulnerability to passes vs. runs, calculated as [yards per pass]/[yards per rush] yielded by opponent over its preceding 10 games. |
| STR | A variable reflecting the score and time remaining, calculated as: [scoring margin]/[minutes remaining in game]; the scoring margin is positive if the team is leading, negative if trailing, 0 if tied. |

TABLE 2-continued

| Explanatory Variable | Description |
|---|---|
| $STR^2$ | $[STR]^2$ or, if STR is negative, $-[STR]^2$; a quadratic form of STR appeared to improve the fit of the model. |
| 2M1H | A variable reflecting time remaining in the first half (0 if more than two minutes) and distance from the team's own goal line on a scale from 0 to 100 (increasing with distance from own goal and as less time remains in half). |
| DD | A variable reflecting the down and distance situation, calculated as: [yards to go]/ (4 − [down]); in other words, the average yards the team must gain on each play in order to make a first down on the third down play. (Examples: on 1st and 10, DD = 3.333; on 3rd and 1, DD = 1.) On 4th down, DD = [yards to go]. |
| $DD^2$ | $[DD]^2$; a quadratic form of DD appeared to improve the fit of the model. |
| Own GL Prox | A variable measuring the team's proximity to its own goal line on a scale from 0 to 100 (100 being closest), calculated as: ([yardage from opponent's goal line]$^2$)/9,801. (The denominator is a scaling factor equal to $99^2$.) |
| Opp GL Prox | A variable measuring the team's proximity to its opponent's goal line on a scale from 0 to 100 (100 being closest), calculated as: ([yardage from own goal line]$^2$)/9,801. (The denominator is a scaling factor equal to $99^2$.) |
| TEs | The number of tight ends on the field. |
| RBs | The number of running backs on the field. |

In one embodiment, the explanatory variables of the MLR model include one or more dummy variables reflecting the presence or absence of one or more of the opponent's key players in the game. This would provide more refined predictions if, for example, the opponent is more likely to run certain categories of plays when the first-string running back is in the game than when he is being rested. Such dummy variables could also correct for anomalies in the statistical database caused by variations in the opponent's personnel. For example, if the database comprised data from the opponent's past six games but their starting quarterback missed two of those games due to injury, such a variable could provide insight into the effect of that player's absence on the opponent's play calling.

FIG. 3A depicts the regression output 200 for a particular category of plays 210, deep dropback passes. The data shown are a subset of the regression output typically generated by commercially available statistical software packages, such as Excel or STATA.

The regression statistics 220 provide diagnostic information about the regression equation as a whole. The R square, for example, is commonly cited as a measure of the "goodness of fit" or the percentage of variation in the dependent variable explained by the regression equation. Although the R squares generated by the methods described herein are lower than might be desirable for some applications of regression modeling techniques, high R squares are neither expected nor required for the methods to be of value in the current application. Because play callers intentionally try to be unpredictable—i.e., to introduce an element of random variation in their play calling—it is unsurprising that equations generated according to the claimed methods explain only limited percentages of the variations in plays called.

In many applications of multiple regression techniques, the primary objective is to understand the impact, if any, of particular explanatory variables on the dependent variable. In such cases, the focus is on the magnitude and sign of the coefficients of, and the diagnostic statistics associated with, each explanatory variable; the R square of the equation is of less importance. FIG. 3 contains a list of the explanatory variables 230, the coefficients 240 of each explanatory variable, and diagnostic statistics 250 associated with each explanatory variable.

Each of the coefficients 240 describes the mathematical relationship between the corresponding explanatory variable 230 and the dependent variable 210—i.e., the probability that the opponent will run a play in the category corresponding to dependent variable 210. If the sign of one of the coefficients 240 is positive, the probability that the opponent will run a play in that category increases as the value of the corresponding explanatory variable 230 gets larger; if the sign of the coefficient 240 is negative, the probability decreases as the value of the corresponding explanatory 230 variable gets larger.

Referring to the diagnostic statistics 250, the t-statistic, in particular, is a commonly cited measure of the statistical significance of the effect of an explanatory variable on the dependent variable. A larger t-statistic provides higher confidence that the corresponding explanatory variable has a meaningful effect on the dependent variable.

As shown in FIG. 3A, STR was highly significant as an explanatory variable in this equation. The negative sign on the coefficient 240 of STR indicates that, when this opponent had a large lead late in the game, they were less likely to call deep dropback passes. While this conclusion may seem obvious, the methods disclosed herein enable the user to quantify this effect and to estimate its magnitude simultaneously with other relevant factors. Moreover, different opponents may exhibit this effect differently; some will deviate from their game plan sooner, or to a greater extent, than others. Described herein are disciplined, systematic, and quantitative methods, leveraging all available data about the opponent's past behavior, to supplement and enhance coaching intuition.

While the coefficient 240 on $STR^2$ is much smaller than the coefficient on STR and bears the opposite sign, it is also statistically significant, suggesting that the effect of STR on the dependent variable 210 gets slightly smaller as STR approaches large positive or large negative values.

The coefficient 240 on OwnGLProx is negative, suggesting that, when the opponent is near its own goal line, it is less likely to call a deep dropback pass, perhaps because the risk of a sack or turnover is heightened given that field position. The coefficient 240 on OppGLProx is also negative, suggesting that the opponent is less likely to call a deep dropback pass when it is near the other team's goal line, perhaps because such plays typically involve deep pass patterns that are ineffective close to the other team's end line.

Not surprisingly, the coefficient 240 on DD is positive, indicating that the opponent is more likely to call a deep dropback pass on late downs with longer yardage to go. Such a call is more likely, for example, on third and 10 than on first and 10 or third and 1. The coefficient 240 on 2M1H is also positive, indicating that the opponent is more likely to call a deep dropback pass during a two-minute drill in the first half.

For comparison purposes, FIG. 3B depicts the regression output 200 for another category of plays 210, runs with zone blocking. This regression was estimated with the same explanatory variables 230 as in FIG. 3A but with a different dependent variable. Again, the coefficient 240 on STR is highly significant but bears the opposite sign, indicating that, when this opponent had a large lead late in the game, they were more likely to call this type of run. The coefficient 240 on DD is also significant but with a negative sign, indicating that this opponent is less likely to call a play in this category on late downs with long yardage to go.

Referring again to FIG. 1, in the next step 50 of the method, the coefficients from the regression equations estimated in step 40 are programmed into a computer to create, for each category of plays, a model of the probability that the opponent will call a play in that category under particular game conditions. The computer is programmed to provide for entry of data used as or to compute the values of the explanatory variables of the equations and to perform all calculations necessary to compute such values.

In the next step 60 of the method, data reflecting particular game conditions are entered into the computer, which calculates and uses a complete set of values of the explanatory variables to solve the regression model for each category of plays. The solutions represent, for each category, a probability that the opponent will run a play in that category under those particular game conditions.

In the experiment described herein, five consecutive games played by a team were reviewed according to step 20. The data from those five games were used to construct the statistical database according to step 30 and that database was used to estimate regression equations according to step 40. The resulting regression coefficients were entered into a computer to create a regression model for each category of plays according to step 50. Data from each offensive play run by the team during its next game were used as or to compute, according to step 60, a complete set of values of the explanatory variables. According to step 70, those values were used to solve the models, generating, for each category of plays, a predicted probability that the team would run a play in that category; the computer was used to sort and display the categories and the associated probabilities.

Figure 4A:
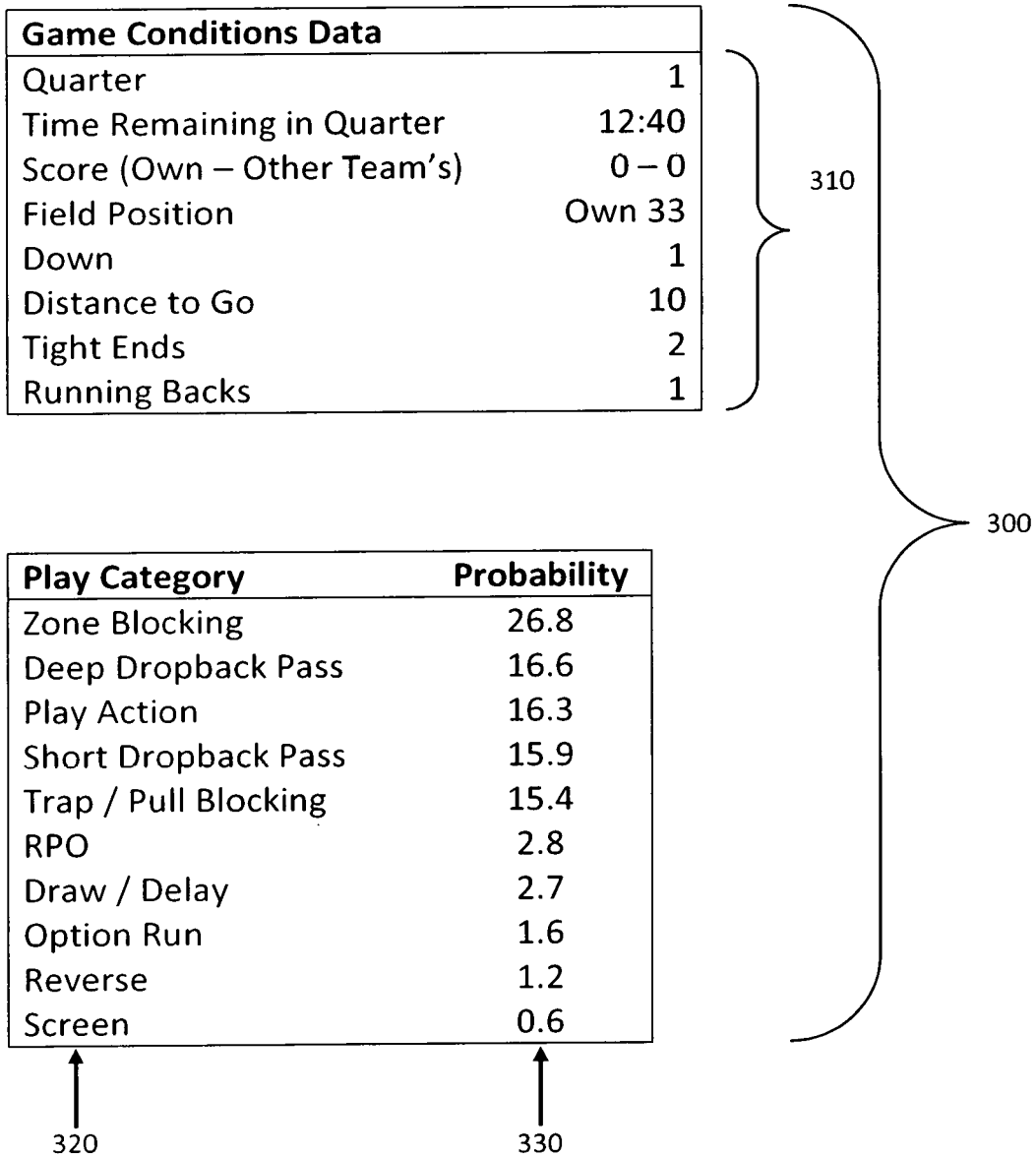
FIG. 4A depicts an exemplary display of the probabilities generated by the multiple regression models, along with the game condition data that were used as or to compute the explanatory variables of the models.

In step 80, the defined categories and the corresponding probabilities calculated in step 70 are sorted by probability, from highest to lowest, and displayed. FIG. 4A depicts an exemplary display 300 of the probabilities generated by the multiple regression models using the experimental data, along with the game condition data 310 that were used as or to compute the explanatory variables of the regression models. Each category of plays 320 and its associated probability 330 is displayed, sorted in order of probability from highest to lowest. (The user may choose not to display every category but a smaller number of categories with the highest predicted probabilities 330.) On the team's first offensive play of the game-n first and 10 and the game tied—the models predicted that the team was most likely to call a play in the "zone blocking" category. Note that, when each of a team's play calls is assigned to exactly one category, and the same values of the explanatory variables are used to solve the model for each category, the sum of the probabilities 330 generated for all categories will equal exactly 1 (100%).

Figure 4B:
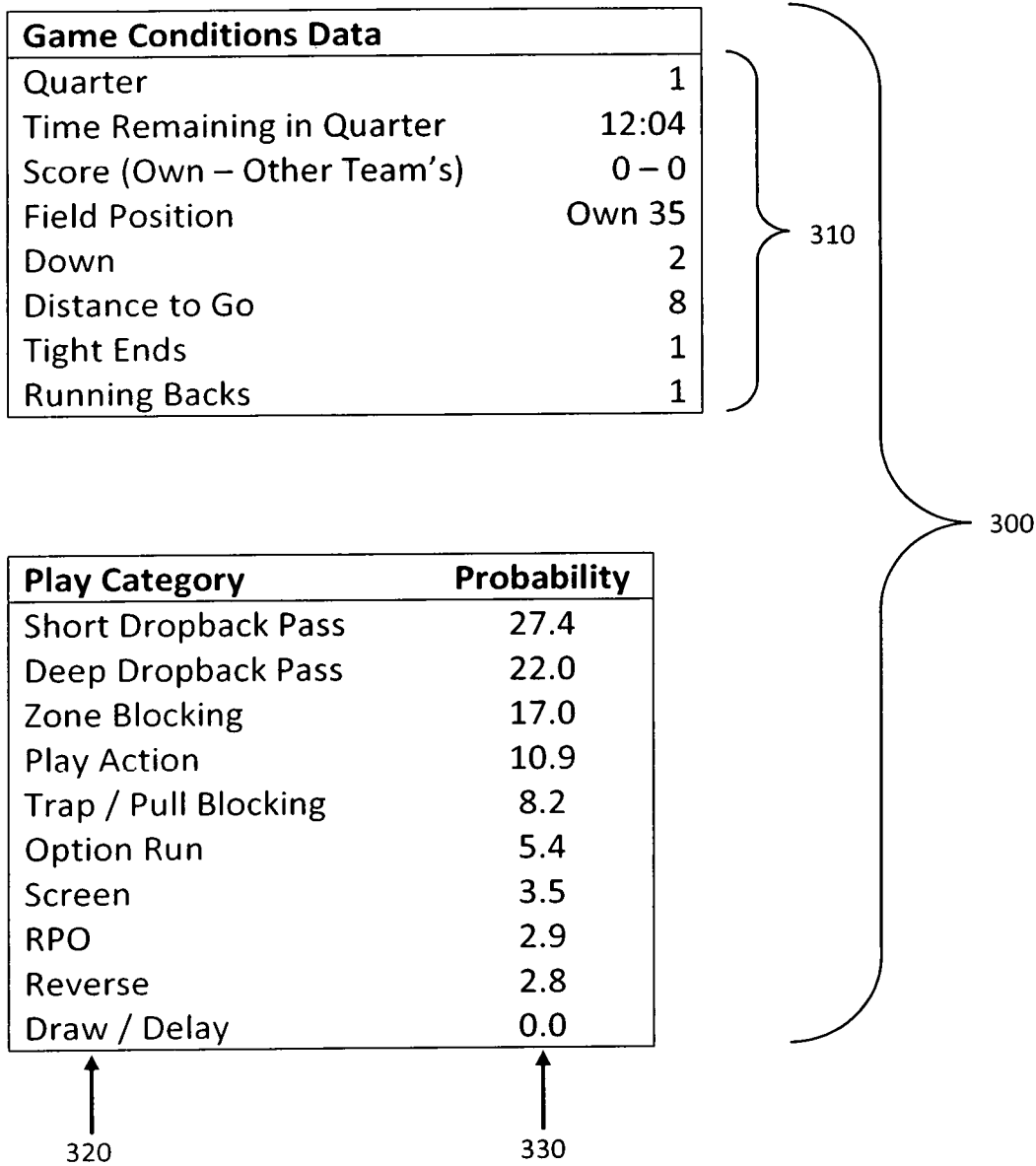
FIG. 4B depicts an exemplary display of the probabilities generated by the multiple regression models based on a different set of game condition data.

For comparison purposes, FIG. 4B depicts an exemplary display 300 of the probabilities 330 generated on the next play in the same experiment. On second and 8, the models predicted that the team was most likely to call a play in the "short dropback pass" category. For further comparison, in FIG. 4C, with the team trailing late in the game, the most likely category was predicted to be "deep dropback pass."

Figure 4C:
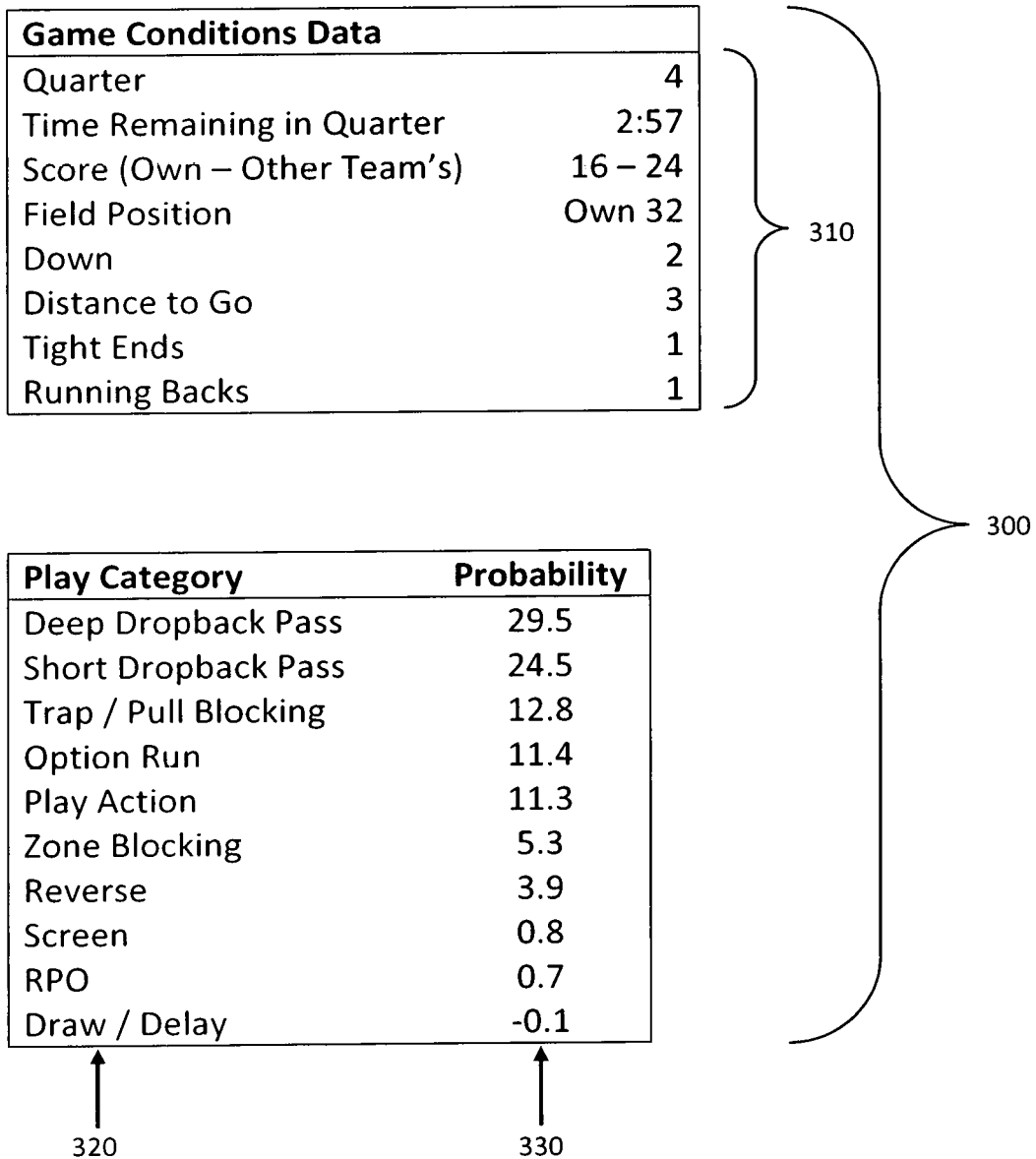
FIG. 4C depicts an exemplary display of the probabilities generated by the multiple regression models based on another set of game condition data.

As reflected in FIG. 4C, linear probability models such as those described herein sometimes yield anomalous predicted probabilities smaller than zero. One possible response is simply to replace any negative predicted values with zero, and rescaling all of the resulting probabilities so that they total 100%. Another possible response is to add the absolute value of the largest negative probability to all of the raw probabilities. A third possibility would be to set the negative values not to zero but to an arbitrarily small positive probability, such as 0.1%. Finally, a skilled practitioner would be familiar with logit or probit modeling techniques that generate probabilities without the possibility of returning negative values.

In the experiment described herein, the probabilities generated by the regression models were compared with the plays actually called by the team studied over the course of an entire game. As shown in Table 3, the team called a play in the category predicted to be most likely (Prediction 1) almost half the time (37 out of 81 plays). The team called a play in one of the two categories predicted to be most likely two-thirds of the time (54 out of 81 plays).

TABLE 3

| Prediction | Frequency | Percentage | Cumulative % |
| --- | --- | --- | --- |
| 1 | 37 | 45.68 | 45.68 |
| 2 | 17 | 20.99 | 66.67 |
| 3 | 5 | 6.17 | 72.74 |
| 4 | 11 | 13.58 | 86.42 |
| 5 | 8 | 9.88 | 96.30 |
| 6 | 0 | 0.00 | 96.30 |
| 7 | 0 | 0.00 | 96.30 |
| 8 | 0 | 0.00 | 96.30 |
| 9 | 3 | 3.70 | 100.00 |
| 10 | 0 | 0.00 | 100.00 |
| Total | 81 | 100.00 | 100.00 |

In one embodiment, the methods disclosed herein may be used to provide predicted probabilities during a game, to assist the user with play calling, when the rules permit. In this embodiment, step 60 in FIG. 1, the entry of relevant game condition data, occurs immediately after the play preceding each play run by the opponent. Step 80, the display of play categories and probabilities, occurs in time to assist with the selection of a scheme and for such scheme to be communicated from the coaches' box to the sideline and/or from the sideline to players on the field. The display may be on a tablet computer or other portable device readily accessible to play callers.

Figure 5:
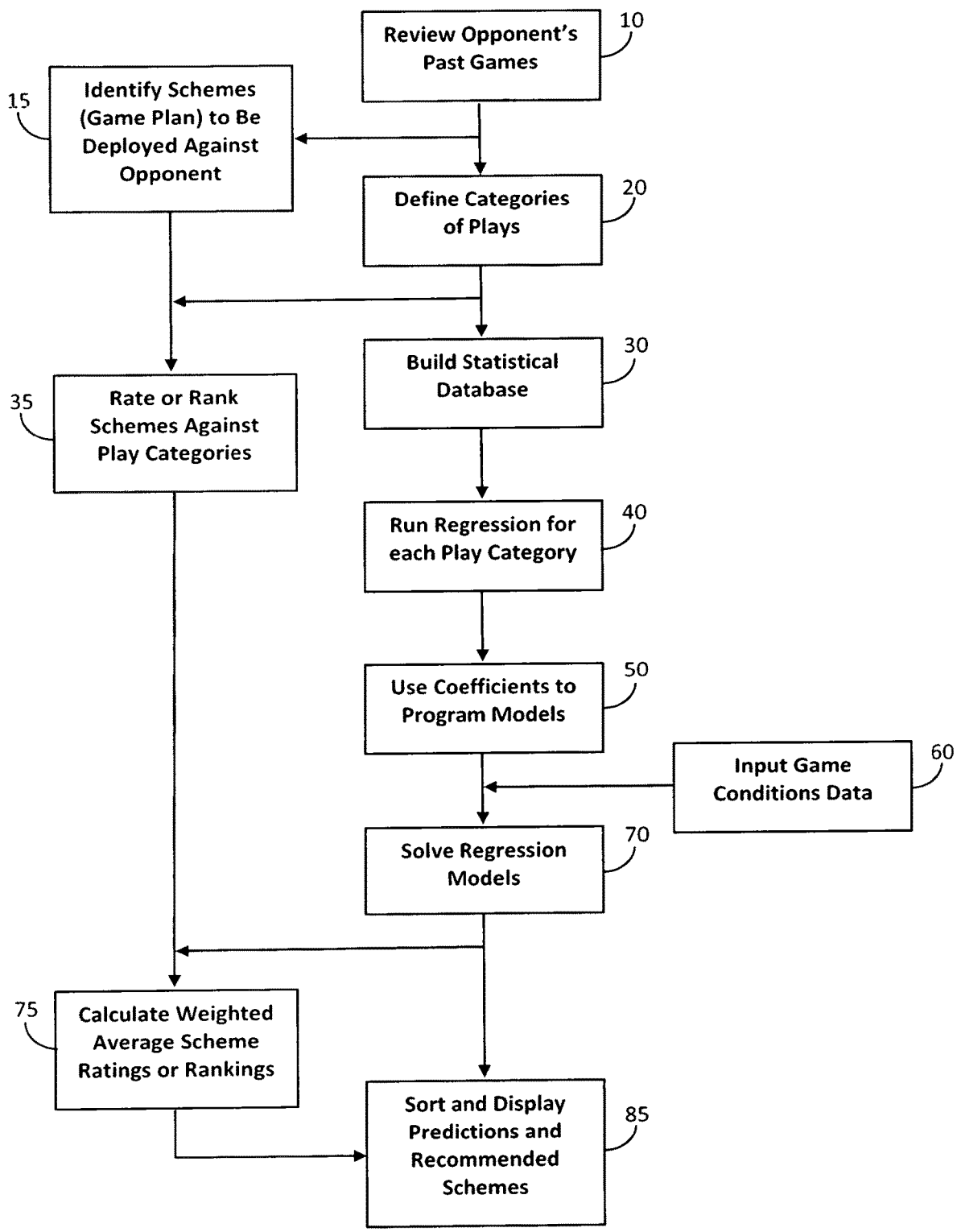
FIG. 5 is a flow chart depicting the steps of an embodiment in which the methods disclosed herein may be used to recommend schemes that are expected to be effective against the categories of plays that the opponent is likely to run.

In another embodiment, the methods disclosed herein may be used to recommend schemes that are expected to be effective against the categories of plays that the opponent is likely to run under given game conditions. FIG. 5 is a flow chart depicting the steps of this embodiment. The probability that the opponent will run a play in each defined category is calculated according to steps 10, 20, 30, 40, 50, 60, and 70 of FIG. 1. In step 15, the user identifies a set of schemes from the game plan that the user is prepared to deploy against the opponent.

Figure 6:
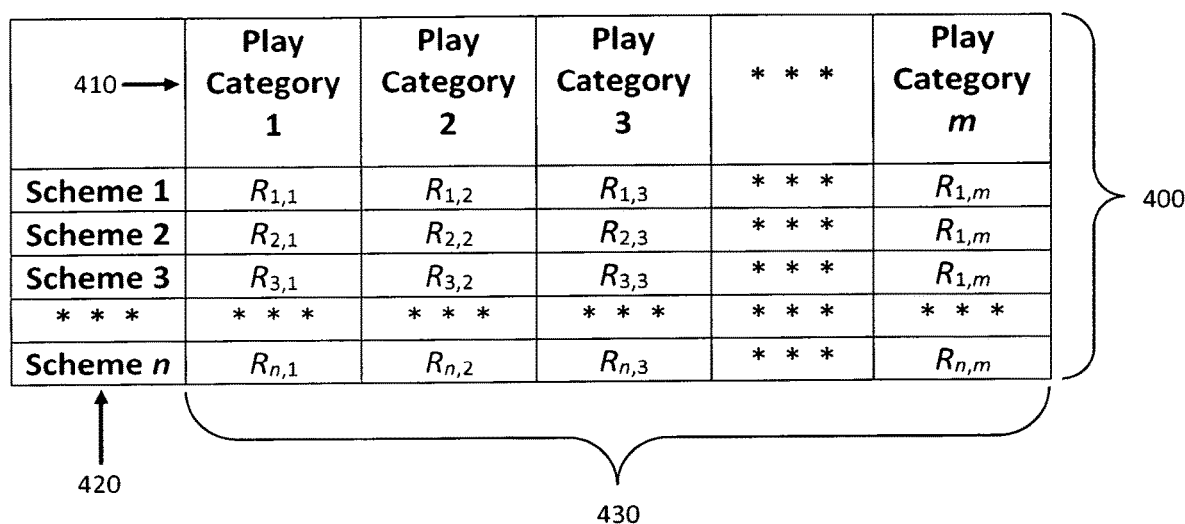
FIG. 6 depicts an example of a matrix resulting from the user's assignment of a numerical rating or ranking to each scheme against each category of plays, based on the expected effectiveness of the scheme against plays in that category.

In step 35, the user assigns a numerical rating or ranking to each identified scheme against each category of plays defined in step 20, based on the expected effectiveness of the scheme against plays in that category. (For purposes of this disclosure, it is assumed that a scheme with a higher rating or ranking is expected to be more effective; more effective schemes could just as easily be denoted with lower ratings or rankings.) FIG. 6 depicts an example of the resulting matrix 400, with m categories of plays 410 and n schemes 420. Each of the cells 430 in the matrix 400 contains the rating or ranking of one of the schemes 420 in the game plan reflecting the user's a priori assessment of the likely effectiveness of that scheme against plays in one of the categories 410. For example, "$R_{2,3}$" is the a priori rating or ranking of scheme 2 against plays in category 3. The ratings or rankings are entered into the computer along with the MLRs.

In step 75, after the probability is calculated for each category of plays, a weighted average rating or ranking for each scheme is calculated according to the following algorithm:

$$\overline{R}_i = \sum_{j=1}^{m} R_{i,j} P_j$$

where $\overline{R}_i$ is the weighted average rating or ranking of scheme i, m is the number of defined categories of plays, $R_{i,j}$ is the a priori rating or ranking of scheme i against plays in category j, and $P_j$ is the predicted probability that the opponent will run a play in category j.

In step 85, the schemes with the highest weighted average ratings or rankings will be displayed as recommended schemes, sorted in order of weighted average rating or ranking, from highest to lowest, under the given game conditions. The user may choose not to display every scheme but may select a smaller number of schemes with the highest weighted average ratings or rankings. The user may also choose whether to display the categories of plays and/or the predicted probability associated with each category.

In still another embodiment, the a priori rankings or ratings can be adjusted during the game, perhaps in response to actual outcomes. The adjusted rankings or ratings will thereafter be used to generate recommended schemes.

The methods disclosed herein may be used to recommend schemes during a game, to assist the user with play calling, when the rules permit. As described above, step 60 of FIG. 5, the entry of relevant game condition data, occurs immediately after the play preceding each play run by the opponent. Step 85, the display of recommended schemes, occurs in time to assist with the selection of a scheme and for such scheme to be communicated from the coaches' box to the sideline and/or from the sideline to players on the field. The display may be on a tablet computer or other portable device readily accessible to play callers.

In order to minimize the delay between the end of the preceding play and the display of the recommended schemes for the next play, it would be advantageous to streamline the entry of new game condition data. In one embodiment, a full set of game condition data will be entered only at the beginning of a drive-which, by definition will result from a score or other change of possession—or after some other event accompanied by an extended stoppage of play, such as a penalty or a time out. Absent such an extended stoppage of play, minimal entry of game condition data will be required.

Figure 7:
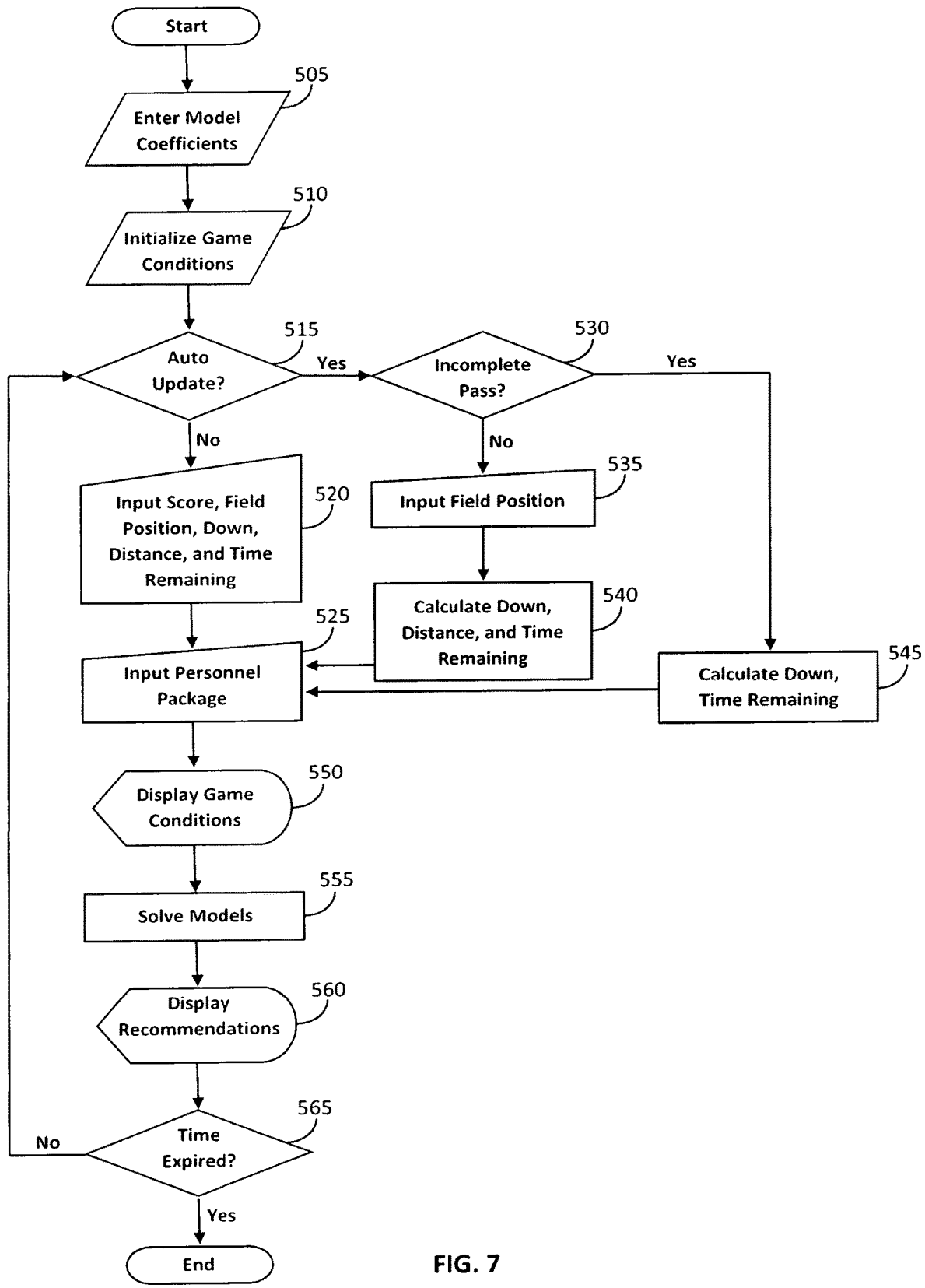
FIG. 7 is an exemplary flow chart of a program for entering game condition data before each play.

FIG. 7 is an exemplary flow chart of a program for entering game condition data before each play. Step 505, entering the play categories and the regression coefficients reflecting the opponent's tendencies, occurs before the game. In step 510, initial values for relevant game conditions-score, quarter, minutes and seconds remaining, down and distance, field position, etc.—are assigned before the first play. This step can include prompting the user for some values that will not change over the course of the game, such as the value of the variable ODYPR, described above.

In step 515, the user is asked whether most of the game conditions can be automatically updated before the next play. The user will respond negatively if the next play is the first play of a drive or in the event of an extended stoppage in play, such as for a penalty, a time out, or the end of a quarter. If the user declines automatic updating in step 515, then, in step 520, the program will prompt the user with the current value of each game condition, allowing the user to enter new values for those conditions that need to be updated. In step 525, the user will be prompted to input relevant changes in the opponent's personnel package, if any. At that point, all game conditions necessary to solve the regression models. will have been updated.

Subsequent to the first play of a drive, and where there has been no extended stoppage of play, the user will select automatic updating when queried in step 515. If the user selects automatic updating, then, in step 530, the program will ask the user whether the previous play resulted in an incomplete pass. If not, in step 535, the program will prompt the user to update the field position resulting from the previous play, if any yardage was gained or lost. From that information, in step 540, the program will automatically calculate the new down and distance (although, if the ball is placed within a yard of the line to gain, the program will prompt the user to confirm whether a first down was made). Because the clock will be running, the program will also estimate the time remaining when the next play is initiated. (To improve the accuracy of such estimates, the user may be prompted as to whether the opponent is in "hurry up" mode.) The program then runs step 525, prompting the user to input any relevant changes in the opponent's personnel package.

If, in step 530, the user indicates that the previous play resulted in an incomplete pass, the program will, in step 545, automatically update the down (the distance to go and field position will be unchanged) and estimate the time remaining (which, since the clock will have stopped as soon as the play ended, can be estimated with reasonable accuracy). The program then runs step 525, prompting the user to input any relevant changes in the opponent's personnel package.

It will be apparent that, regardless of how the game condition data are updated, the update concludes with step 525. As soon as that input is received, in step 550, the program displays a complete set of the updated game conditions. In step 555, the program calculates any necessary explanatory variables, solves the regression models, and, in some embodiments, formulates recommendations to the user with regard to likely effective schemes. In step 560, the predicted play categories, corresponding probabilities, and/or recommended schemes are sorted and displayed.

After the predicted play categories, corresponding probabilities, and/or recommended schemes are displayed, in step 565, the program evaluates whether the time remaining in the game has reached zero. If so (and the score is not tied), the program terminates. Otherwise, the program returns to step 515, to begin the process of updating game condition data for the next play.

Even if the use of computer technology in the manner described herein is prohibited on the sideline or in the coaches' box during games, the methods described herein can be used to enhance game preparation and improve play calling. Those methods can be used, for example, to identify, confirm, and quantify the significance of keys that should be included in the scouting report on an opponent.

In one embodiment, the explanatory variables used in the regression models include data on the opponent's formation at the snap. Referring again to FIG. 2, such data would be included in the statistical database in fields 140. The explanatory variables could reflect, for example, the number of running backs in the backfield, whether tight ends or wide receivers are lined up close to the interior line, and whether the quarterback is under center or in the shotgun. (Because the offense, by using motions and shifts, can conceal its ultimate formation until a second or two before the snap, such variables cannot be used to provide real-time predictions/recommendations as described above.) In the experiment summarized in Table 3, the inclusion in the regression models of several variables reflecting the formation at snap improved the accuracy of the highest probability prediction to 53.09%.

The categories of plays may be defined to indicate the lateral direction, left or right, to which certain types of plays were run. Similarly, the explanatory variables may reflect data with a directional component—e.g., strong side, position relative to hash marks, the number of split receivers on each side of the formation. The resulting regression models may provide insight into the tendencies of an opponent to run particular types of plays to the left or right, to the strong or weak side, to the wide side or short side of the field, etc., under particular game conditions-information that might enhance the value of scouting reports.

The methods described herein could be used to assist in play calling even without using computer technology on the sideline or in the coaches' box by, for example, facilitating the development of more sophisticated play sheets. Such play sheets could take into account not only down, distance and field position, but also the score, time remaining, and personnel packages. Potentially, a number of different play sheets could be prepared for each game; the user would select a particular sheet to use during a given drive based on the game conditions at the outset of that drive.

The methods described herein could also be used to improve the efficiency of practices. Those methods could be used, for example, to focus the user on the categories of plays that the opponent is most likely to run, ensuring the most productive allocation of practice time. Those methods could enable the scout teams to simulate the opponent's behavior more accurately.

Finally, an important aspect of game preparation is self-scouting. The user could utilize the methods described herein to analyze its own play calling to ensure that it does not exhibit any predictable tendencies that could be exploited by opponents.

What is claimed is:

1. A method of analyzing the play calling tendencies of an American football opponent, comprising:
    defining at least three distinct, non-overlapping categories of plays that the opponent might call, all such categories together being exhaustive of the universe of plays that the opponent might call;
    collecting information on the plays that the opponent actually called in prior games, assigning each such play to exactly one of the defined categories, and collecting information about the score, time remaining, down and distance, field position, personnel package, and other relevant information in the prior games when each such play was called;
    inputting all such information collected into a computerized statistical database; for each of the at least three defined categories of plays, performing a multiple regression wherein each observation is a play that the opponent ran in a past game, the dependent variable is a binary variable indicating whether the play that the opponent ran was in that category, and the explanatory variables reflect the game conditions during that play;
    using appropriate explanatory variables reflecting the game conditions, to estimate the probability that the opponent will run a play in that category given various game conditions;
    programming a computer to use the coefficients estimated by each such regression to model the probability that the opponent will run a play in the corresponding category under particular conditions during a game;
    entering sets of game conditions into the computer to use as or to calculate values for the explanatory variables of the models; and
    solving the models for each category of plays and displaying each category, along with the predicted probability that the opponent will run a play in that category, sorted by probability, from highest to lowest.

2. The method of claim 1 wherein the explanatory variables include one or more dummy variables reflecting the presence or absence in the game of key individual players on the opposing team.

3. The method of claim 1 further comprising
    inputting data about the game conditions into the computer during a game, before each play by the opponent, immediately after the conclusion of the preceding play;
    computing the predicted probability that the opponent will run a play in each category or plays; and
    displaying the categories of plays and predicted probabilities on a computer display in time to assist in the selection of a scheme by the user and for such scheme to be communicated to players on the field.

4. The method of claim 3 wherein, for plays that do not follow extended stoppages of play,
    the user inputs only the fact that the preceding play resulted in an incomplete pass or the field position after the play and relevant changes in the opponent's personnel package; and
    the computer calculates or estimates other game conditions.

5. The method of claim 1 further comprising identifying a set of schemes that the user is prepared to deploy against the opponent;
    assigning a numerical rating or ranking to each such scheme against each category of plays, based on the expected effectiveness of the scheme against plays in that category;
    identifying recommended schemes, based on the average rating or ranking of each scheme against all of the play categories, weighted by the predicted probability that the opponent will run a play in each category; and
    displaying the recommended schemes in order of weighted average rating or ranking, from highest to lowest.

6. The method of claim 5 further comprising displaying the recommended schemes on a computer display in time to assist in the selection of a scheme by the user and for such scheme to be communicated to players on the field.

7. The method of claim 6 wherein, for plays that do not follow extended stoppages of play, the user inputs only the fact that the preceding play resulted in an incomplete pass or the field position after the play and relevant changes in the opponent's personnel package; and the computer calculates or estimates other game conditions.

8. The method of claim 6 wherein the a priori ranks or ratings can be adjusted during the course of a game.

9. The method of claim 1 wherein the information collected includes information about the formation from which the opponent ran each play in prior games and that information is used to formulate additional explanatory variables used in the models.

10. The method of claim 1 wherein the coefficients and/or the predicted probabilities generated by the models are used in the preparation of scouting reports on the opponent.

11. The method of claim 1 wherein the coefficients and/or the predicted probabilities generated by the models are used in the preparation of play sheets to be used during a game against the opponent.

12. The method of claim 1 wherein the coefficients and/or the predicted probabilities generated by the models are used to allocate practice time.

13. The method of claim 1 wherein the coefficients and/or the predicted probabilities generated by the models are used to enable the scout teams to simulate the opponent's behavior more accurately.

14. The method of claim 1 wherein the opponent whose tendencies are analyzed is the user's team and the coefficients and/or the predicted probabilities generated by the models are used for self-scouting.

* * * * *